United States Patent
Katayama et al.

(10) Patent No.: US 8,318,854 B2
(45) Date of Patent: Nov. 27, 2012

(54) COMPOSITION FOR THERMOSETTING SILICONE RESIN

(75) Inventors: Hiroyuki Katayama, Osaka (JP); Takashi Kondo, Osaka (JP); Hirokazu Matsuda, Osaka (JP); Ryuichi Kimura, Osaka (JP)

(73) Assignee: Nitto Denko Corporation, Osaka (JP)

( * ) Notice: Subject to any disclaimer, the term of this patent is extended or adjusted under 35 U.S.C. 154(b) by 1 day.

(21) Appl. No.: 13/151,366

(22) Filed: Jun. 2, 2011

(65) Prior Publication Data
US 2011/0301276 A1 Dec. 8, 2011

(30) Foreign Application Priority Data

Jun. 2, 2010 (JP) ................................. 2010-126820
Nov. 25, 2010 (JP) ................................. 2010-262445

(51) Int. Cl.
*C08L 83/04* (2006.01)
*B32B 9/04* (2006.01)

(52) U.S. Cl. ........ 524/588; 524/492; 524/493; 525/477; 525/478; 525/479; 528/15; 528/17; 528/21; 428/405; 428/447

(58) Field of Classification Search .................... None
See application file for complete search history.

(56) References Cited

U.S. PATENT DOCUMENTS

| | | | | |
|---|---|---|---|---|
| 5,610,230 | A * | 3/1997 | Yoshida et al. | 524/730 |
| 6,395,807 | B1 * | 5/2002 | Kinose et al. | 523/443 |
| 8,084,520 | B2 * | 12/2011 | Zenbutsu | 523/457 |
| 2003/0129347 | A1 | 7/2003 | Yamakawa et al. | |
| 2004/0116640 | A1 | 6/2004 | Miyoshi | |
| 2005/0282022 | A1 * | 12/2005 | Christian et al. | 428/446 |

FOREIGN PATENT DOCUMENTS

| | | |
|---|---|---|
| EP | 0169529 A2 | 1/1986 |
| EP | 0273706 A2 | 7/1988 |
| EP | 2196503 A1 | 6/2010 |
| EP | 2219242 A2 | 8/2010 |
| JP | 6-118254 A | 4/1994 |
| JP | 2000-198930 A | 7/2000 |
| JP | 2004-186168 A | 7/2004 |
| JP | 2008-150437 A | 7/2008 |

OTHER PUBLICATIONS

Communication dated Feb. 8, 2012 from the European Patent Office in counterpart European application No. 11168425.4.

* cited by examiner

*Primary Examiner* — Marc Zimmer
(74) *Attorney, Agent, or Firm* — Sughrue Mion, PLLC

(57) ABSTRACT

The present invention relates to a composition for a thermosetting silicone resin, including: (1) an organopolysiloxane having a silanol group at an end thereof; (2) an alkenyl group-containing silicon compound; (3) an epoxy group-containing silicon compound; (4) an organohydrogensiloxane; (5) a condensation catalyst; (6) a hydrosilylation catalyst; and (7) a silica particle, in which the (7) silica particle has a 50% volume cumulative diameter of from 2 to 50 μm, a content of particles having a particle size of 1 μm or less of 15% by number or less and a content of particles having a particle size of 60 μm or more of 15% by number or less.

10 Claims, No Drawings

COMPOSITION FOR THERMOSETTING SILICONE RESIN

FIELD OF THE INVENTION

The present invention relates to a composition for a thermosetting silicone resin. More particularly, the invention relates to a composition for a thermosetting silicone resin which can form a semi-cured state where encapsulation processing of an optical semiconductor element can be performed; a silicone resin sheet that is a semi-cured material of the composition; a resin cured material obtained by further curing the sheet; and an optical semiconductor device encapsulated with the sheet.

BACKGROUND OF THE INVENTION

High-power white LED devices whose application to generic illumination has been studied demand encapsulation materials having light resistance and heat resistance. In recent years, so-called "addition curing type silicone" has been heavily used.

This addition curing type silicone is one obtained by thermal curing of a mixture mainly composed of a silicone derivative having a vinyl group on a main chain thereof and a silicone derivative having an SiH group on a main chain thereof in the presence of a platinum catalyst. For example, Patent Document 1 discloses a resin composition which provides a cured material having excellent transparency and insulating characteristics, obtained by introducing an organopolysiloxane into a composition to set a molar ratio of a silicon-bonded hydrogen atom in the composition and an alkenyl group to a specific range.

Patent Document 2 discloses a resin composition containing a silicone resin having at least two silicon atom-bonded alkenyl groups in one molecule thereof and an organohydrogensilane and/or an organohydrogensiloxane each having at least two silicon atom-bonded hydrogen atoms in one molecule thereof.

Patent Document 3 discloses a composition which gives a cured material with an excellent strength by using a linear polyorganohydrogensiloxane having a silicon atom-bonded hydrogen atom (an Si—H group) midway a molecular chain thereof in combination with a linear polyorganohydrogensiloxane having an Si—H group at both ends of a molecular chain thereof in specific amounts.

On the other hand, in the addition curing type silicone resin, since a platinum catalyst with high activity is generally used, when a curing reaction once starts, it is extremely difficult to stop the reaction halfway, and it is difficult to form a semi-cured state (stage B). Then, for the purpose of lowering the catalytic activity of the platinum catalyst, it is known to be effective to add a phosphorus compound, a nitrogen compound, a sulfur compound or an acetylene as a reaction inhibitor (see, for example, Patent Document 4).

Patent Document 1: JP-A-2000-198930
Patent Document 2: JP-A-2004-186168
Patent Document 3: JP-A-2008-150437
Patent Document 4: JP-A-6-118254

SUMMARY OF THE INVENTION

However, although the conventional addition curing type silicone resins have excellent durability, they are composed of a viscous liquid before the curing reaction, so that handling becomes complicated, and the viscosity varies depending on the surrounding environment in some cases. Thus, they remain unsatisfactory.

Also, compounds known as a reaction inhibitor exert an influence on durability of the resins, so that another method of reaction control is required.

An object of the invention is to provide a composition for a thermosetting silicone resin capable of forming a semi-cured state where encapsulation processing of an optical semiconductor element can be performed and having, in addition to light resistance and heat resistance, excellent mechanical strength and adhesiveness, a silicone resin sheet that is a semi-cured material of the composition, a resin cured material obtained by further curing the sheet and an optical semiconductor device encapsulated with the sheet.

In order to solve the foregoing problem, the present inventors made extensive and intensive investigations. As a result, it has been found that by blending a silica particle in a composition containing both of a silicone component relating to a condensation reaction and a silicone component relating to an addition reaction, it becomes possible to perform a curing reaction stepwise, thereby enabling one to form a stable semi-cured state, and nevertheless the silica particle is blended, the mechanical strength and adhesiveness can also be enhanced without lowering the excellent heat resistance and light resistance inherent to the silicone component.

Namely, the present invention relates to the following items 1 to 10.

1. A composition for a thermosetting silicone resin, including:
   (1) an organopolysiloxane having a silanol group at an end thereof;
   (2) an alkenyl group-containing silicon compound;
   (3) an epoxy group-containing silicon compound;
   (4) an organohydrogensiloxane;
   (5) a condensation catalyst;
   (6) a hydrosilylation catalyst; and
   (7) a silica particle,
   in which the (7) silica particle has a 50% volume cumulative diameter of from 2 to 50 µm, a content of particles having a particle size of 1 µm or less of 15% by number or less and a content of particles having a particle size of 60 µm or more of 15% by number or less.

2. The composition according to item 1, in which the (1) organopolysiloxane having a silanol group at an end thereof comprises a compound represented by the following formula (I):

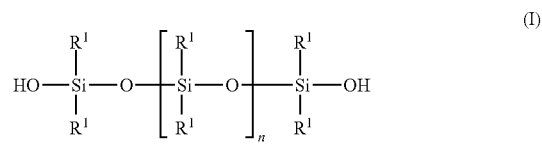

in which $R^1$ represents a monovalent hydrocarbon group; and n represents an integer of 1 or more, provided that all $R^1$ groups may be the same or different from each other.

3. The composition according to item 1 or 2, in which the (2) alkenyl group-containing silicon compound includes a compound represented by the following formula (II):

in which $R^2$ represents a substituted or unsubstituted alkenyl group; and $X^1$ represents a halogen atom, an alkoxy group, a phenoxy group or an acetoxy group, provided that three $X^1$ groups may be the same or different from each other.

4. The composition according to any one of items 1 to 3, in which the (3) epoxy group-containing silicon compound includes a compound represented by the following formula (III):

wherein $R^3$ represents an epoxy structure-containing substituent; and $X^2$ represents a halogen atom, an alkoxy group, a phenoxy group or an acetoxy group, provided that three $X^2$ groups may be the same or different from each other.

5. The composition according to any one of items 1 to 4, in which the (4) organohydrogensiloxane is at least one kind selected from the group consisting of a compound represented by the following formula (IV):

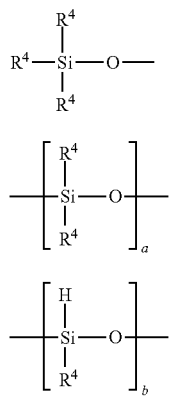

in which each of A, B and C represents a constituent unit, A represents an end unit, and each of B and C represents a repeating unit; $R^4$ represents a monovalent hydrocarbon group; a represents 0 or an integer of 1 or more; and b represents an integer of 2 or more, provided that all $R^4$ groups may be the same or different from each other; and a compound represented by the following formula (V):

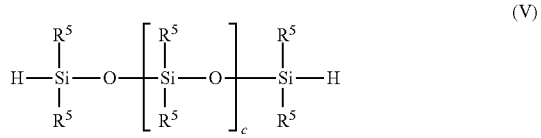

in which $R^5$ represents a monovalent hydrocarbon group; and c represents 0 or an integer of 1 or more, provided that all $R^5$ groups may be the same or different from each other.

6. The composition according to any one of items 1 to 5, in which the (7) silica particle has a surface treated with a basic silane coupling agent.

7. The composition according to any one of items 1 to 6, in which the (7) silica particle has a 50% volume cumulative diameter of from 2 to 30 μm.

8. A silicone resin sheet obtained by semi-curing the composition according to any one of items 1 to 7.

9. A silicone resin cured material obtained by curing the silicone resin sheet according to item 8.

10. An optical semiconductor device obtained by encapsulating an optical semiconductor element with the silicone resin sheet according to item 8.

The composition for a thermosetting silicone resin of the invention is able to form a semi-cured state where encapsulation processing of an optical semiconductor element can be performed, and also, it gives rise to excellent effects for enabling one to provide a silicone resin composition having, in addition to light resistance and heat resistance, excellent mechanical strength and adhesiveness.

DETAILED DESCRIPTION OF THE INVENTION

The composition for a thermosetting silicone resin of the invention includes (1) an organopolysiloxane having a silanol group at an end thereof; (2) an alkenyl group-containing silicon compound; (3) an epoxy group-containing silicon compound; (4) an organohydrogensiloxane; (5) a condensation catalyst; (6) a hydrosilylation catalyst; and (7) a silica particle, and it has such a significant characteristic feature that in addition to a monomer relating to a condensation reaction and a monomer relating to an addition reaction (hydrosilylation reaction), a silica particle having specified particle size distribution is contained.

A semi-cured state (hereinafter also referred to as "stage B") of a general epoxy resin or the like is usually achieved by controlling a thermosetting condition. Specifically, for example, a crosslinking reaction of a monomer is allowed to partially proceed by heating at 80° C., thereby preparing pellets of the stage B. Then, the resulting pellets are subjected to desired molding processing and then completely cured by heating at 150° C. On the other hand, an addition curing type thermosetting silicone resin is obtained by an addition reaction (hydrosilylation reaction) of a silicone derivative having a vinyl group on a main chain thereof and a silicone derivative having an SiH group on a main chain thereof. However, since a platinum catalyst with high reactivity is generally used, when a curing reaction once starts, it is extremely difficult to stop the reaction halfway, and therefore, it is difficult to form the stage B. Also, although there is known a method of controlling the reaction with a reaction inhibitor, the progress of reaction varies depending on the kind and use amount of the reaction inhibitor, and therefore, the control with the reaction inhibitor is not easy.

As for the composition of the invention, by containing a monomer relating to each reaction so as to perform the crosslinking reaction of monomers in two kinds of reaction systems having a different reaction temperature from each other, namely a condensation reaction system and an addition reaction (hydrosilylation reaction) system, the reaction temperature is adjusted to control the crosslinking reaction, thereby preparing pellets of the stage B. That is, it may be supposed that in the composition of the invention, a resin in a semi-cured state is first prepared by subjecting a monomer relating to the condensation reaction to a condensation reaction, and subsequently, a monomer relating to the hydrosilylation reaction is subjected to an addition reaction, whereby a completely cured resin can be prepared. Accordingly, so far as the hydrosilylation reaction is not caused, the semi-cured state can be kept, and the storage stability at the stage B is guaranteed. Also, since any of the resin monomers in the composition of the invention contains a silicone in a main skeleton, the resulting resin composition has excellent heat resistance and light resistance. Furthermore, in view of the facts that an epoxy group-containing compound is included in the monomers and that the epoxy group is able to impart adhesiveness due to its flexible structure with high polarity, the resulting resin composition is excellent in the adhesiveness.

In addition to such characteristics, in the invention, by blending a silica particle having specified particle size distribution, it becomes possible to more enhance the mechanical strength and adhesiveness. Although a technique for blending a silica particle in a silicone resin to increase the mechanical strength has hitherto been well known, the blending of the silica particle simultaneously causes a lowering of light transmittance and an increase of haze, and when used as an LED encapsulating material, a great lowering of light extraction efficiency is perceived. However, in the invention, in view of the fact that by blending a specified silica particle, not only the mechanical strength is enhanced, but also the backward scattering becomes small, the curing condition of a composition having the foregoing formulation can be relieved while suppressing a lowering of luminance, and in its turn, the adhesiveness can be more enhanced. Also, when such a silica particle is subjected to a surface treatment with a silane coupling agent, it serves as an inhibitor of the hydrosilylation reaction, thereby enabling one to enhance the preservability of the resin in a semi-cured state. Incidentally, in this specification, the semi-cured material, namely the material in a semi-cured state (stage B), means a material in a state between stage A where the material is soluble in a solvent and stage C where the material is completely cured, and in a state where curing or gelation slightly proceed, so that the material is swollen but not completely dissolved in a solvent, and is softened but not melted by heating. The completely cured material means a material in a state where curing or gelation has completely proceeded.

The composition for a thermosetting silicone resin of the invention includes:

(1) an organopolysiloxane having a silanol group at an end thereof;
(2) an alkenyl group-containing silicon compound;
(3) an epoxy group-containing silicon compound;
(4) an organohydrogensiloxane;
(5) a condensation catalyst;
(6) a hydrosilylation catalyst; and
(7) a silica particle.

(1) Organopolysiloxane Having a Silanol Group at an End Thereof:

From the viewpoint of compatibility with each of the components, the organopolysiloxane having a silanol group at an end thereof in the invention preferably includes a compound represented by the following formula (I).

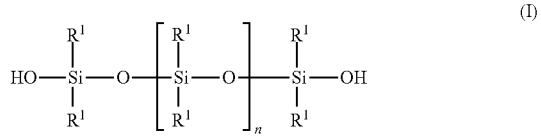

In the formula (1), $R^1$ represents a monovalent hydrocarbon group; and n represents an integer of 1 or more, provided that all $R^1$ groups may be the same or different from each other.

Incidentally, in the invention, in view of the fact that the end silanol group of the organopolysiloxane having a silanol group at an end thereof causes a condensation reaction, the subject monomer is referred to as a "condensation reaction system monomer".

In the formula (I), $R^1$ represents a monovalent hydrocarbon group, and examples thereof include saturated or unsaturated, linear, branched or cyclic hydrocarbon groups. From the viewpoints of easiness of the preparation and thermal stability, the carbon number of the hydrocarbon group is preferably from 1 to 20, and more preferably from 1 to 10. Specific examples thereof include a methyl group, an ethyl group, a propyl group, a butyl group, a pentyl group, a hexyl group, a phenyl group, a naphthyl group, a cyclohexyl group and a cyclopentyl group. Above all, from the viewpoints of transparency and light resistance, a methyl group is preferable. Incidentally, in the formula (I), though all $R^1$ groups may be the same or different from each other, it is preferable that all $R^1$ groups are a methyl group.

In the formula (I), n represents an integer of 1 or more. From the viewpoints of stability and handling properties, n is preferably an integer of from 1 to 10,000, and more preferably an integer of from 1 to 1,000.

Examples of such a compound represented by the formula (I) include a dual-end silanol type polydimethylsiloxane, a dual-end silanol type polymethylphenylsiloxane and a dual-end silanol type polydiphenylsiloxane. These can be used either alone or as a combination of two or more kinds thereof. Of these, a compound in which all $R^1$ groups are a methyl group, and n is an integer of from 1 to 1,000 is preferable.

The compound represented by the formula (I) may be a commercially available product, or may be one synthesized according to a known method.

From the viewpoints of stability and handling properties, it is desirable that a molecular weight of the compound represented by the formula (I) is preferably from 100 to 1,000,000, and more preferably from 100 to 100,000. Incidentally, in this specification, the molecular weight of the silicone derivative is measured by the gel permeation chromatography (GPC).

A content of the compound represented by the formula (I) in the organopolysiloxane having a silanol group at an end thereof is preferably 50% by weight or more, more preferably 80% by weight or more, and still more preferably substantially 100% by weight.

A content of the organopolysiloxane having a silanol group at an end thereof is preferably from 1 to 99% by weight, more preferably from 50 to 99% by weight, and still more preferably from 80 to 99% by weight in the composition.

(2) Alkenyl Group-Containing Silicon Compound:

The alkenyl group-containing silicon compound in the invention is a monomer relating to a hydrosilylation reaction in view of the fact that the alkenyl group causes a hydrosilylation reaction to achieve resinification. Also, though other substituent than the alkenyl group is not particularly limited, when a functional group relating to the condensation reaction is present, the alkenyl group-containing silicon compound serves as a compound capable of reacting with all of the monomer relating to the condensation reaction and the monomer relating to the hydrosilylation reaction, and the resins of the both reaction systems are bonded to each other via the subject compound, whereby a cured material with more excellent heat resistance is obtained. Incidentally, the functional group relating to the condensation reaction means a functional group capable of undergoing a condensation reaction with the OH group of the component (1). Specific examples thereof include a halogen atom, an alkoxy group, a phenoxy group and an acetoxy group.

From such viewpoints, the alkenyl group-containing silicon compound in the invention includes preferably a compound having an alkenyl group and a functional group relating to the condensation reaction, which is represented by the following formula (II).

$$R^2\text{—}Si(X^1)_3 \qquad (II)$$

In the formula (II), $R^2$ represents a substituted or unsubstituted alkenyl group; and $X^1$ represents a halogen atom, an alkoxy group, a phenoxy group or an acetoxy group, provided that three $X^1$ groups may be the same or different from each other.

$R^2$ in the formula (II) represents a substituted or unsubstituted alkenyl group and is an organic group containing an alkenyl group in a skeleton thereof. From the viewpoints of easiness of the preparation and thermal stability, the carbon number of the organic group is from 1 to 20, and more preferably from 1 to 10. Specific examples thereof include a vinyl group, an allyl group, a propenyl group, a butenyl group, a pentenyl group, a hexenyl group, a heptenyl group, an octenyl group, a norbornenyl group and a cyclohexenyl group. Above all, from the viewpoint of reactivity relative to the hydrosilylation reaction, a vinyl group is preferable.

$X^1$ in the formula (II) represents a halogen atom, an alkoxy group, a phenoxy group or an acetoxy group, and all of them are a functional group relating to the condensation reaction. From the viewpoints of reactivity and handling properties, the halogen atom is preferably a chlorine atom, a bromine atom or an iodine atom, and more preferably a chlorine atom. From the viewpoints of reactivity and handling properties, the alkoxy group is preferably a methoxy group, an ethoxy group, a propoxy group, a butoxy group or a cyclohexyloxy group, and more preferably a methoxy group. Incidentally, in the formula (II), although three $X^1$ groups may be the same or different from each other, it is preferable that all of them are a methoxy group.

Examples of such a compound represented by the formula (II) include vinyltrichlorosilane, vinyltribromosilane, vinyltriiodosilane, vinyltrimethoxysilane, vinyltriethoxysilane, allyltrimethoxysilane, propenyltrimethoxysilane, norbornenyltrimethoxysilane and octenyltrimethoxysilane. These can be used either alone or as a combination of two or more kinds thereof. Of these, vinyltrimethoxysilane in which $R^2$ is a vinyl group, and all $X^1$ groups are a methoxy group is preferable.

The compound represented by the formula (II) may be a commercially available product, or may be one synthesized according to a known method.

A content of the compound represented by the formula (II) in the alkenyl group-containing silicon compound is preferably 50% by weight or more, more preferably 80% by weight or more, and still more preferably substantially 100% by weight.

A content of the alkenyl group-containing silicon compound is preferably from 0.01 to 90% by weight, more preferably from 0.01 to 50% by weight, and still more preferably from 0.01 to 10% by weight in the composition.

Also, from the viewpoint of strength of the resulting cured material, a content of the alkenyl group-containing silicon compound is preferably from 0.01 to 10 parts by weight, and more preferably from 0.1 to 5 parts by weight based on 100 parts by weight of the organopolysiloxane having a silanol group at an end thereof.

(3) Epoxy Group-Containing Silicon Compound:

The epoxy group-containing silicon compound in the invention is not particularly limited so far as it contains an epoxy group. The epoxy group may be bonded directly to silicon, or an organic group partially containing the epoxy group may be bonded to silicon. Also, when the epoxy group-containing silicon compound contains a functional group relating to the condensation reaction as a substituent other than the above, the compound is bonded to the monomer relating to the condensation reaction. As a result, it may be considered that the epoxy groups are present in the cured material in a well-dispersed state to enhance the adhesiveness. Incidentally, in this specification, the epoxy group and the organic group partially containing the epoxy group are referred to as an "epoxy structure-containing substituent".

From such a viewpoint, the epoxy group-containing silicon compound in the invention preferably includes a compound having an epoxy group and a functional group relating to the condensation reaction, which is represented by the following formula (III).

$$R^3\text{—}Si(X^2)_3 \qquad (III)$$

In the formula (III), $R^3$ represents an epoxy structure-containing substituent; and $X^2$ represents a halogen atom, an alkoxy group, a phenoxy group or an acetoxy group, provided that three $X^2$ groups may be the same or different from each other.

$R^3$ in the formula (III) represents an epoxy structure-containing substituent and is an organic group containing an epoxy group in a skeleton thereof. Specific examples thereof include a 3-glycidoxypropyl group, an epoxycyclohexylethyl group, a glycidyl group, an epoxycyclohexyl group and an epoxycyclopentyl group. Above all, from the viewpoints of reactivity and handling properties, a 3-glycidoxypropyl group and an epoxycyclohexylethyl group are preferable.

$X^2$ in the formula (III) represents a halogen atom, an alkoxy group, a phenoxy group or an acetoxy group, and all of them are a functional group relating to the condensation reaction. From the viewpoints of reactivity and handling properties, the halogen atom is preferably a chlorine atom, a bromine atom or an iodine atom, and more preferably a chlorine atom. From the viewpoints of reactivity and handling properties, the alkoxy group is preferably a methoxy group, an ethoxy group, a propoxy group, a butoxy group or a cyclohexyloxy group, and more preferably a methoxy group. Incidentally, in the formula (III), although three $X^2$ groups may be the same or different from each other, it is preferable that all of them are a methoxy group.

Examples of such a compound represented by the formula (III) include the following compounds.

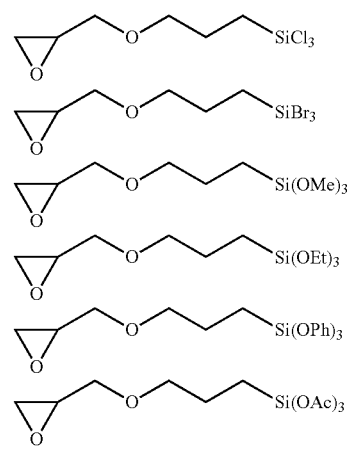

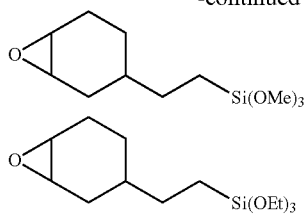

These can be used either alone or as a combination of two or more kinds thereof. Of these, (3-glycidoxypropyl)trimethoxysilane in which $R^3$ is a 3-glycidoxypropyl group, and all $X^2$ groups are a methoxy group; and epoxycyclohexylethyltrimethoxysilane in which $R^3$ is an epoxycyclohexylethyl group, and all $X^2$ groups are a methoxy group are preferable.

The compound represented by the formula (III) may be a commercially available product, or may be one synthesized according to a known method.

A content of the compound represented by the formula (III) in the epoxy group-containing silicon compound is preferably 50% by weight or more, more preferably 80% by weight or more, and still more preferably substantially 100% by weight.

A content of the epoxy group-containing silicon compound is preferably from 0.01 to 90% by weight, more preferably from 0.01 to 50% by weight, and still more preferably from 0.01 to 10% by weight in the composition.

Also, from the viewpoint of adhesiveness of the resulting cured material, a content of the epoxy group-containing silicon compound is preferably from 0.001 to 10 parts by weight, and more preferably from 0.01 to 5 parts by weight based on 100 parts by weight of the organopolysiloxane having a silanol group at an end thereof.

As an embodiment of the invention, when $X^1$ of the alkenyl group-containing silicon compound and $X^2$ of the epoxy group-containing silicon compound are a functional group relating to the condensation reaction, from the viewpoint of allowing the SiOH group of the organopolysiloxane having a silanol group at an end thereof, the $SiX^1$ group of the alkenyl group-containing silicon compound and the $SiX^2$ group of the epoxy group-containing silicon compound to react with each other in the proper quantity, a molar ratio $[SiOH/(SiX^1+SiX^2)]$ of the foregoing functional groups is preferably from 20/1 to 0.2/1, more preferably from 10/1 to 0.5/1, and still more preferably substantially equivalent (1/1). When the foregoing molar ratio is 20/1 or less, a semi-cured material having moderate toughness is obtained at the time of semi-curing the composition of the invention, whereas when the foregoing molar ratio is 0.2/1 or more, the alkenyl group-containing silicon compound and the epoxy group-containing silicon compound do not become too much, resulting in favorable heat resistance of the resulting resin.

Moreover, when $X^1$ of the alkenyl group-containing silicon compound and $X^2$ of the epoxy group-containing silicon compound are a functional group relating to the condensation reaction, from the viewpoint of adhesiveness of the resulting cured material, a weight ratio of the alkenyl group-containing silicon compound and the epoxy group-containing silicon compound [(alkenyl group-containing silicon compound)/(epoxy group-containing silicon compound)] is preferably 200/1 or less, and more preferably 100/1 or less. On the other hand, when the foregoing weight ratio is preferably 0.1/1 or more, and more preferably 1/1 or more, toughness of the resulting cured material becomes favorable. Accordingly, the foregoing weight ratio is preferably from 200/1 to 0.1/1, and more preferably from 100/1 to 1/1.

(4) Organohydrogensiloxane:

Although the organohydrogensiloxane in the invention is not particularly limited, from the viewpoint of compatibility with each of the components, it is preferably at least one kind selected from the group consisting of a compound represented by the following formula (IV):

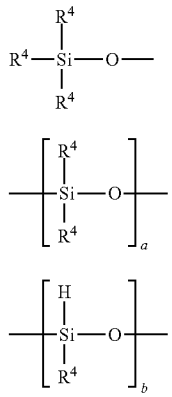

in which each of A, B and C represents a constituent unit, A represents an end unit, and each of B and C represents a repeating unit; $R^4$ represents a monovalent hydrocarbon group; a represents 0 or an integer of 1 or more; and b represents an integer of 2 or more, provided that all $R^4$ groups may be the same or different from each other; and a compound represented by the following formula (V):

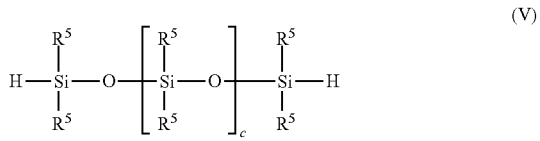

in which $R^5$ represents a monovalent hydrocarbon group; and c represents 0 or an integer of 1 or more, provided that all $R^5$ groups may be the same or different from each other.

Incidentally, in view of the fact that the SiH group of the organohydrogensiloxane causes a hydrosilylation reaction, the organohydrogensiloxane is referred to as a "monomer relating to the hydrosilylation reaction".

The compound represented by the formula (IV) is a compound constituted of the constituent units A, B and C, in which A is an end unit, each of B and C is a repeating unit, and the hydrogen atom is contained in the repeating unit.

All of $R^4$ groups in the formula (IV), namely, all of $R^4$ in the constituent unit A, $R^4$ in the constituent unit B and $R^4$ in the constituent unit C, represent a monovalent hydrocarbon group, and examples thereof include saturated or unsaturated, linear, branched or cyclic hydrocarbon groups. From the viewpoints of easiness of the preparation and thermal stability, the carbon number of the hydrocarbon group is preferably from 1 to 20, and more preferably from 1 to 10. Specific examples thereof include a methyl group, an ethyl group, a propyl group, a butyl group, a pentyl group, a hexyl group, a phenyl group, a naphthyl group, a cyclohexyl group and a cyclopentyl group. Above all, from the viewpoints of transparency and light resistance, a methyl group or an ethyl group is preferable. Incidentally, in the formula (IV), all $R^4$ groups may be the same or different from each other, and each of them independently represents the foregoing hydrocarbon group regardless of the constituent unit.

The constituent unit A is an end unit, and two units are contained in the formula (IV).

The repeating unit number of the constituent unit B, namely, a in the formula (IV), represents 0 or an integer of 1 or more. From the viewpoint of reactivity, a is preferably an integer of from 1 to 1,000, and more preferably an integer of from 1 to 100.

The repeating unit number of the constituent unit C, namely, b in the formula (IV), represents an integer of 2 or more. From the viewpoint of reactivity, b is preferably an integer of from 2 to 10,000, and more preferably an integer of from 2 to 1,000.

Examples of such a compound represented by the formula (IV) include a methylhydrogensiloxane, a dimethylpolysiloxane-CO-methylhydrogenpolysiloxane, an ethylhydrogenpolysiloxane and a methylhydrogenpolysiloxane-CO-methylphenylpolysiloxane. These can be used either alone or as a combination of two or more kinds thereof. Of theses, a compound in which $R^4$ is a methyl group, a is an inter of 1 or more, and b is an integer of 2 or more; and a compound in which $R^4$ is an ethyl group, a is an integer of 1 or more, and b is an integer of 2 or more are preferable.

From the viewpoints of stability and handling properties, it is desirable that a molecular weight of the compound represented by the formula (IV) is preferably from 100 to 1,000,000, and more preferably from 100 to 100,000.

The compound represented by the formula (V) is a compound having hydrogen at an end thereof.

$R^5$ in the formula (V) represents a monovalent hydrocarbon group, and examples thereof include saturated or unsaturated, linear, branched or cyclic hydrocarbon groups. From the viewpoints of easiness of the preparation and thermal stability, the carbon number of the hydrocarbon group is preferably from 1 to 20, and more preferably from 1 to 10. Specific examples thereof include a methyl group, an ethyl group, a propyl group, a butyl group, a pentyl group, a hexyl group, a phenyl group, a naphthyl group, a cyclohexyl group and a cyclopentyl group. Above all, from the viewpoints of transparency and light resistance, a methyl group or an ethyl group is preferable. Incidentally, in the formula (V), though all $R^5$ groups may be the same as or different from each other, it is preferable that all $R^5$ groups are a methyl group or an ethyl group.

c in the formula (V) represents 0 or an integer of 1 or more. From the viewpoint of reactivity, c is preferably an integer of from 1 to 10,000, and more preferably an integer of from 1 to 1,000.

Examples of such a compound represented by the formula (V) include a dual-end hydrosilyl type polydimethylsiloxane, a dual-end hydrosilyl type polymethylphenylsiloxane and a dual-end hydrosilyl type polydiphenylsiloxane. These can be used either alone or as a combination of two or more kinds thereof. Of these, a compound in which all $R^5$ groups are a methyl group, and c is an integer of from 1 to 1,000; and a compound in which all R5 groups are an ethyl group, and c is an integer of from 1 to 1,000 are preferable.

From the viewpoints of stability and handling properties, it is desirable that a molecular weight of the compound represented by the formula (V) is preferably from 100 to 1,000,000, and more preferably from 100 to 100,000.

Each of the compounds represented by the formulae (IV) and (V) may be a commercially available product, or may be one synthesized according to a known method.

A total content of the compounds represented by the formulae (IV) and (V) in the organohydrogensiloxane is preferably 50% by weight or more, more preferably 80% by weight or more, and still more preferably substantially 100% by weight.

A content of the organohydrogensiloxane is preferably from 0.1 to 99% by weight, more preferably from 0.1 to 90% by weight, and still more preferably from 0.1 to 80% by weight in the composition.

Also, as for a weight ratio of the alkenyl group-containing silicon compound and the organohydrogensiloxane, from the viewpoint of allowing the $SiR^2$ group of the alkenyl group-containing silicon compound and the SiH group of the organohydrogensiloxane to react with each other in the proper quantity, a molar ratio of the foregoing functional groups ($SiR^2$/SiH) is preferably from 20/1 to 0.1/1, more preferably from 10/1 to 0.2/1, still more preferably from 10/1 to 0.5/1, and yet still more preferably substantially equivalent (1/1). When the foregoing molar ratio is 20/1 or less, moderate toughness is obtained at the time of semi-curing the composition of the invention, whereas when the foregoing molar ratio is 0.2/1 or more, the organohydrogensiloxane does not become too much, resulting in favorable heat resistance and toughness of the resulting resin.

From the viewpoint of viscoelasticity at the time of sheet formation, a weight ratio of the organopolysiloxane having a silanol group at an end thereof and the organohydrogensiloxane [(organopolysiloxane having a silanol group at an end thereof)/(organohydrogensiloxane)] is preferably from 99.9/0.1 to 1/99.9, more preferably from 99.9/0.1 to 50/50, and still more preferably 99.9/0.1 to 90/10.

(5) Condensation Catalyst:

The condensation catalyst in the invention is not particularly limited so far as it is a compound which catalyzes the condensation reaction between the silanol groups of the organopolysiloxane having a silanol group at an end thereof, or which when the $X^1$ group of the alkenyl group-containing silicon compound and the $X^2$ group of the epoxy group-containing silicon compound are a functional group relating to the condensation reaction, catalyzes the condensation reaction among the silanol groups of the organopolysiloxane having a silanol group at an end thereof, the $SiX^1$ group of the alkenyl group-containing silicon compound and the $SiX^2$ group of the epoxy group-containing silicon compound. Examples of the condensation catalyst include acids such as hydrochloric acid, acetic acid, formic acid and sulfuric acid; bases such as potassium hydroxide, sodium hydroxide, potassium carbonate and a tetraalkylammonium hydroxide including tetramethylammonium hydroxide; and metal based catalysts such as aluminum, titanium, zinc and tin. Above all, from the viewpoints of compatibility and thermal degradability, tetramethylammonium hydroxide is preferable.

Though tetramethylammonium hydroxide in a solid state may be used as it is, from the viewpoint of handling properties, it is preferable to use tetramethylammonium hydroxide as an aqueous solution or a methanol solution. From the viewpoint of transparency of the resin, it is more preferable to use tetramethylammonium hydroxide as a methanol solution.

A content of the condensation catalyst in the composition is preferably from 0.1 to 50 moles, and more preferably from 1.0 to 5 moles based on 100 moles of the organopolysiloxane having a silanol group at an end thereof.

Also, when a tetraalkylammonium hydroxide is used as the condensation catalyst, a content of the tetraalkylammonium hydroxide is preferably from 0.1 to 50 moles, more preferably from 0.1 to 5 moles, and still more preferably from 0.1 to 2 moles based on 100 moles of the organopolysiloxane having a silanol group at an end thereof. For example, when the content of the tetraalkylammonium hydroxide is 0.1 moles or more, the condensation reaction sufficiently proceeds, and hence, such is preferable. Also, when the content of the tetraalkylammonium hydroxide is not more than 2 moles, not only the progress of condensation reaction is favorable, but the reaction between a trace amount of methanol or water existing in the reaction system and the SiH group of the organohydrogensiloxane is not accelerated during the synthesis of the composition for thermosetting resin, thereby suppressing the formation of an SiOMe group or an SiOH group, so that the occurrence of an additional condensation reaction can be suppressed. As a result, an increase of the viscosity of the composition can be suppressed, or the generation of a hydrogen gas can be suppressed, and hence, such is more preferable. Moreover, there is freed from a concern that a hydrosilylation catalyst which accelerates the hydrosilylation reaction, for example, a platinum catalyst, is inactivated with tetramethylammonium hydroxide which does not contribute to the condensation reaction, and hence, such is more preferable.

(6) Hydrosilylation Catalyst:

The hydrosilylation catalyst in the invention is not particularly limited so far as it is a compound which catalyzes the hydrosilylation reaction between a hydrosilane compound and an alkene. Examples thereof include platinum catalysts such as platinum black, platinum chloride, chloroplatinic acid, a platinum-olefin complex, a platinum-carbonyl complex and platinum-acetyl acetate; palladium catalysts; and rhodium catalysts. Above all, from the viewpoints of compatibility, transparency and catalytic activity, a platinum-carbonyl complex such as a platinum-1,3-divinyl-1,1,3,3-tetramethyldicyclohexane complex is preferable.

For example, when a platinum catalyst is used, from the viewpoint of reaction rate, a content of the hydrosilylation catalyst in the composition is preferably from $1.0 \times 10^{-4}$ to 0.5 parts by weight, and more preferably from $1.0 \times 10^{-3}$ to 0.05 parts by weight based on 100 parts by weight of the organohydrogensiloxane in terms of the content of platinum.

(7) Silica Particle:

The silica particle in the invention is able to improve the adhesiveness to an inorganic material, namely the resistance from an external force due to not only an enhancement of the mechanical strength of the resulting resin composition but an enhancement of destructive force resistance. Also, when the mechanical strength of the composition is enhanced, the resistance to a shear also increases, and the adhesiveness is enhanced. Furthermore, as compared with the case where silica is not mixed, the degree of progress of the curing reaction until the strength reaches to a certain level can be decreased, resulting in enabling the curing condition to be relieved.

The silica particle in the invention is not particularly limited so far as it is a particle having specified particle size distribution and containing silica as a main component. Examples thereof include, in addition to anhydrous silica, ones containing aluminum silicate, sodium silicate, potassium silicate and magnesium silicate. Also, as for a form thereof, there are exemplified fumed silica, precipitated silica, fused silica, crushed silica and crystalline silica. Incidentally, the "main component" as referred to herein means a component accounting for 50% or more of components constituting the particle.

From the viewpoint of suppressing a lowering of the luminance, an average particle size of the silica particle is from 2 to 50 μm. The average particle size of the silica particle is preferably from 2 to 30 μm because in the light scattering by the Mie scattering, the forward scattering is large, and an effect for suppressing a lowering of the luminance is obtained. Incidentally, in this specification, the average particle size of the silica particle means a 50% volume cumulative diameter and can be measured by a method described in the Examples as described later.

Also, since particles having a small particle size cause the Rayleigh scattering, the larger the amount of particles having a small particle size, the larger the backward scattering is. Accordingly, a content of particles having a particle size of 1 μm or less in the silica particle is 15% by number or less, preferably 10% by number or less, more preferably 1% by number or less, and still more preferably substantially 0% by number. On the other hand, in particles having a large particle size, since the reflection on the particle-matrix interface is large in conformity with the geometric optics law, a lowering of the luminance is generated. Accordingly, a content of particles having a particle size of 60 μm or more in the silica particle is 15% by number or less, preferably 10% by number or less, more preferably 3% by number or less, and still more preferably substantially 0% by number. Incidentally, in this specification, the content (% by number) of particles having a particle size of 1 μm or less in the silica particle as converted into a number and the content (% by number) of particles having a particle size of 60 μm or more in the silica particle as converted into a number can be measured by a method described in the Examples as described later.

Moreover, from the viewpoint of suppressing a lowering of the luminance, a coefficient of variation (CV, %) of the particle size of the silica particle is preferably smaller. Incidentally, the coefficient of variation (CV, %) of the particle size as referred to herein means a value obtained by dividing a standard deviation of the particle size distribution by an average value and expresses a scale of variation of the particle size distribution. It is meant that the smaller the coefficient of variation (CV, %), the smaller the variation is.

As for the silica particle having such particle size and particle size distribution, a silica particle in which the particle size distribution is adjusted according to a known method may be used, or a commercially available product may be used. Examples of the suitable commercial product include fused silica particles such as FB-40S, FB-7SDC and FB-3SDC, all of which are manufactured by Denki Kagaku Kogyo Kabushiki Kaisha; and monodispersed silica particles such as N3N-3 and NSN-20, all of which are manufactured by Ube-Nitto Kasei Co., Ltd.

A shape of the silica particle may be one in which visible light can be scattered, and examples thereof include a spherical shape and a crushed shape. From the viewpoint of suppressing a lowering of the luminance, a spherical shape is preferable.

Also, in the invention, from the viewpoint of modifying physical properties of the silica particle surface, it is preferable that the surface of the silica particle is treated with a silane coupling agent.

As the silane coupling agent, known silane coupling agents are used without particular limitations. From the viewpoint of suppressing the adsorption between the condensation catalyst and the silica particle surface, a basic silane coupling agent is preferable, and an amine-based silane coupling agent having an amino group is more preferable.

Specific examples of the amine-based silane coupling agent include 3-aminopropyltrimethoxysilane, N-2-(aminoethyl)-3-aminopropyltrimethoxysilane and 3-aminopropyltriethoxysilane.

The surface treatment method is not particularly limited, and examples thereof include known methods. For example, there is exemplified a method (wet method) in which a silica particle and a silane coupling agent are stirred in a solvent at from 10 to 100° C. for from 0.1 to 72 hours.

A use amount of the silane coupling agent is preferably from 0.001 to 1,000 parts by weight, and more preferably from 0.01 to 100 parts by weight based on 100 parts by weight of the silica particle to be subjected to a surface treatment.

Incidentally, as for the particle size and particle size distribution of the silica particle after the surface treatment with a silane coupling agent, the average particle size of the silica particle does not substantially fluctuate by the surface treatment, so that it is substantially the same as one before the treatment.

From the viewpoints of enhancing the mechanical strength and adhesiveness of the resin and keeping the transparency and flowability of the resin before curing, a content of the silica particle is preferably from 0.1 to 70 parts by weight, and more preferably from 5 to 60 parts by weight based on 100 parts by weight of the total amount of the components (1) to (6).

The composition for thermosetting silicone resin of the invention can contain, in addition to the foregoing components, other arbitrary components within the range where the effects of the invention are not impaired. Examples thereof include inorganic fillers such as titanium oxide, zirconium oxide, magnesium oxide, zinc oxide, iron oxide, aluminum hydroxide, calcium carbonate, layered mica, carbon black, diatomaceous earth, glass fibers, and oxide, nitride or oxynitride phosphors activated with a lanthanoid series element; and those fillers having been subjected to a surface treatment with an organosilicon compound such as an organoalkoxysilane, an organochlorosilane and an organosilazane.

Also, the composition for thermosetting silicone resin of the invention may contain additives such as an antioxidant, a modifying agent, a surfactant, a dye, a pigment, a discoloration preventing agent, an ultraviolet light absorber, a creep-hardening preventing agent, a plasticizer, a thixotropy imparting agent and an anti-mold agent.

The composition for thermosetting silicone resin of the invention can be prepared without particular limitations so far as it contains respective components of (1) the organopolysiloxane having a silanol group at an end thereof, (2) the alkenyl group-containing silicon compound, (3) the epoxy group-containing silicon compound, (4) the organohydrogensiloxane, (5) the condensation catalyst, (6) the hydrosilylation catalyst and (7) the silica particle. From the viewpoint of appropriately selecting the reaction temperature and time depending on respective reaction mechanisms of the condensation reaction and the hydrosilylation reaction to allow the reaction to proceed and to be completed, the composition of the invention may be prepared by previously mixing the components relating to the condensation reaction, then mixing the components relating to the addition reaction and finally mixing the silica particle therewith.

The mixing of the components relating to the condensation reaction can be performed by stirring (1) the organopolysiloxane having a silanol group at an end thereof, (2) the alkenyl group-containing silicon compound, (3) the epoxy group-containing silicon compound and (5) the condensation catalyst and optionally, an additive such as an organic solvent preferably at from 0 to 60° C. for from 5 minutes to 24 hours.

Incidentally, the alkenyl group-containing silicon compound is a component relating to all of the condensation reaction and the hydrosilylation reaction. However, it is preferable that the alkenyl group-containing silicon compound is simultaneously mixed with (1) the organopolysiloxane having a silanol group at an end thereof because the condensation reaction is initiated at a lower temperature than the hydrosilylation reaction.

The organic solvent is not particularly limited. From the viewpoint of enhancing the compatibility of the silicone derivative and the condensation catalyst, 2-propanol is preferable.

An existing amount of the organic solvent is preferably from 3 to 20 parts by weight, and more preferably from 5 to 10 parts by weight based on 100 parts by weight of the total amount of the organopolysiloxane having a silanol group at an end thereof, the alkenyl group-containing silicon compound and the epoxy group-containing compound. When the existing amount of the organic solvent is 3 parts by weight or more, the reaction proceeds satisfactorily, whereas when it is 20 parts by weight or less, foaming of the composition in the curing step is reduced.

Incidentally, the condensation reaction among the SiOH group of the organopolysiloxane having a silanol group at an end thereof, the $SiX^1$ group of the alkenyl group-containing silicon compound and the $SiX^2$ group of the epoxy group-containing compound may be partially initiated. The degree of progress of the condensation reaction can be confirmed by a degree of disappearance of a peak derived from the SiOH group by the $^1$H-NMR measurement.

Next, (4) the organohydrogensiloxane and (6) the hydrosilylation catalyst are mixed as components relating to the hydrosilylation reaction with the mixture of the foregoing components relating to the condensation reaction. At the time of obtaining a cured material by subjecting the composition of the invention to two kinds of reactions including the condensation reaction and the hydrosilylation reaction, it is possible to prepare a molded article in a semi-cured state by performing only the condensation reaction. Accordingly, the mixing method is not particularly limited so far as the components relating to the addition reaction are uniformly mixed with the mixture of the foregoing components relating to the condensation reaction.

The mixing of the silica particle can be performed by adding a silica particle (if desired, a silica particle having been previously subjected to a surface treatment with a silane coupling agent) to a material in which the components relating to the hydrosilylation reaction is mixed with the mixture of the components relating to the condensation reaction and stirring the resulting mixture preferably at from 0 to 60° C. for from 1 to 120 minutes. Incidentally, the mixing method is not particularly limited so far as the silica particle is uniformly dispersed in the mixture.

A viscosity of the thus obtained composition of the invention at 25° C. is preferably from 10 to 1,000,000 mPa·s, and more preferably from 1,000 to 100,000 mPa·s. In this specification, the viscosity can be measured using a B-type viscometer.

Also, the composition for thermosetting silicone resin of the invention can be molded into a sheet form by applying it in an appropriate thickness onto, for example, a release sheet whose surface has been subjected to a release treatment (for example, an organic polymer film such as a polyester substrate, a ceramic, a metal, etc.) by a method such as casting, spin coating and roll coating and then drying the applied composition by heating at such a temperature that the solvent can be removed. The heating temperature cannot be unequivocally determined depending upon the kind of the solvent to be used. However, in the composition of the invention, in addition to the removal of the solvent, the condensation reaction is completed by this heating, whereby a silicone resin sheet in a semi-cured state (stage B) can be prepared. Accordingly, the invention also provides a silicone resin sheet obtained by semi-curing the composition for thermosetting silicone resin of the invention. Incidentally, in this specification, the "completion of the reaction" means the case where 80% or more of the functional groups relating to the reaction have reacted, and in the condensation reaction, it can be confirmed by measuring the SiOH group content by the foregoing $^1$H-NMR.

A heating temperature is preferably from 20 to 200° C., and more preferably from 40 to 150° C. A heating time is preferably from 0.1 to 120 minutes, and more preferably from 1 to 60 minutes.

Although a thickness of the silicone resin sheet is not particularly limited, it is preferably from 100 to 10,000 μm, and more preferably from 100 to 3,000 μm.

Since the silicone resin sheet of the invention is in a semi-cured state, for example, an optical semiconductor device can be prepared by placing it on an optical semiconductor element as it is or via a known resin potted on the optical semiconductor element and performing encapsulation processing, followed by heating at a high temperature to achieve complete curing of the resin sheet. Accordingly, the invention provides an optical semiconductor device obtained by encapsulating an optical semiconductor element with the silicone resin sheet of the invention. The complete curing of the resin sheet is carried out by the reaction of the components relating to the hydrosilylation reaction. Accordingly, as another embodiment of the invention, there is provided a silicone resin cured material obtained by curing the silicone resin sheet of the invention.

A method of placing the sheet on the substrate and then performing encapsulation processing is not particular limited. For example, there is exemplified a method of heating preferably at from 100 to 200° C. and from 0.01 to 10 MPa, and more preferably at from 120 to 180° C. and from 0.1 to 1 MPa for from 2 to 600 seconds using a laminator.

Also, post-curing can be subsequently performed. A heating temperature is preferably from 120 to 250° C., and more preferably from 150 to 200° C. A heating time is preferably from 0.5 to 48 hours, and more preferably from 1 to 24 hours.

Incidentally, the degree of progress of the hydrosilylation reaction can be confirmed by a degree of absorption of a peak derived from the SiH group of the organohydrogensiloxane by the IR measurement. When the absorption intensity is less than 20% of an initial value (before the curing reaction), the hydrosilylation reaction is completed, so that the resin sheet is completely cured.

EXAMPLES

The invention is hereunder described on the basis of the following Examples and Comparative Examples, but it should not be construed that the invention is limited to these Examples.

[Molecular Weight of Silicone Derivative]

The molecular weight is determined as converted into polystyrene by the gel permeation chromatography (GPC).

[Average Particle Size of Silica Particle, Content of Particles Having a Particle Size of 1 μm or Less, Content of Particles Having a Particle Size of 60 μM or More, and Coefficient of Variation (CV)]

In this specification, the average particle size of the silica particle means an average particle size of primary particles and refers to a 50% volume cumulative diameter ($D_{50}$) calculated by measuring a particle liquid dispersion of the silica particle by the dynamic light scattering method. Also, a content (% by number) of particles having a particle size of 1 μm or less, a content (% by number) of particles having a particle size of 60 μm or more and a coefficient of variation (CV, %) of particle size distribution were determined from the particle size distribution obtained at the foregoing measurement.

[Viscosity of Composition]

A viscosity was measured using a rheometer (B-type viscometer) under a condition at 25° C. and 1 atm.

Example 1

20.31 g (0.177 moles) of an organopolysiloxane having a silanol group at an end thereof [a compound represented by the formula (I) in which all $R^1$ groups are a methyl group, and n is 155, average molecular weight: 11,500] heated at 40° C. was mixed with 15.76 g (0.106 moles) of vinyltrimethoxysilane [a compound represented by the formula (II) in which $R^2$ is a vinyl group, and all $X^1$ groups are a methoxy group] as an alkenyl group-containing silicon compound and 2.80 g (0.0118 moles) of (3-glycidoxypropyl)trimethoxysilane [a compound represented by the formula (III) in which $R^3$ is a 3-glycidoxypropyl group, and all $X^2$ groups are a methoxy group] as an epoxy group-containing silicon compound [a ratio of a molar number of the SiOH group of the organopolysiloxane having a silanol group at an end thereof and a total molar number of the $SiX^1$ group of the alkenyl group-containing silicone compound and the $SiX^2$ group of the epoxy group-containing silicon compound [SiOH/($SiX^1$+$SiX^2$)] is 1/1] with stirring, and a tetramethylammonium hydroxide methanol solution (concentration: 10% by weight) was then added as a condensation catalyst in an amount of 0.97 mL (catalyst amount: 0.88 moles; 0.50 moles based on 100 moles of the organopolysiloxane having a silanol group at an end thereof), followed by stirring the mixture at 40° C. for one hour. The resulting oil was evacuated (10 mmHg) while stirring at 40° C. for one hour, thereby removing a volatile matter. Subsequently, the reaction solution was returned to atmospheric pressure, and an organohydrogensiloxane [a compound represented by the formula (IV) in which all $R^4$ groups are a methyl group, a is 10, and b is 10, viscosity: 20 mPa·s] was then added in an amount of 44.67 g [0.319 moles; a molar ratio of the $SiR^2$ group of the alkenyl group-containing silicon compound and the SiH group of the organohydrogensiloxane ($SiR^2$/SiH) is 1/3.0], followed by stirring the mixture at 40° C. for one hour. Thereafter, a platinum-carbonyl complex (platinum concentration: 2% by weight) was added as a hydrosilylation catalyst in an amount of 0.13 mL (the platinum content is 0.0058 parts by weight based on 100 parts by weight of the organohydrogensiloxane), followed by stirring the mixture at 40° C. for 10 minutes. To 100 g of the resulting oil, 100 g of a silica particle (FB-40S, manufactured by Denki Kagaku Kogyo Kabushiki Kaisha, average particle size: 40 μm, content of particles having a particle size of 1 μm or less: 2% by number, content of particles having a particle size of 60 μm or more: 15% by number, CV: 45%) was added, and the mixture was stirred at room temperature (20° C.) for 10 minutes, thereby obtaining a composition for a silicone resin (silica particle content: 50% by weight).

Example 2

A composition for a silicone resin (silica particle content: 30% by weight) was obtained in the same manner as in Example 1, except that in Example 1, the use amount of the silica particle (FB-40S) was changed from 100 g to 43 g.

Example 3

A composition for a silicone resin (silica particle content: 30% by weight) was obtained in the same manner as in Example 1, except that in Example 1, 43 g of a silica particle (FB-7SDC, manufactured by Denki Kagaku Kogyo Kabushiki Kaisha, average particle size: 5.8 μm, content of particles having a particle size of 1 μm or less: 8% by number, content of particles having a particle size of 60 μm or more: 0% by number, CV: 59%) was used instead of using 100 g of the silica particle (FB-40S).

Example 4

A composition for a silicone resin (silica particle content: 30% by weight) was obtained in the same manner as in Example 1, except that in Example 1, 43 g of a silica particle (FB-3SDC, manufactured by Denki Kagaku Kogyo Kabushiki Kaisha, average particle size: 3.4 μm, content of particles having a particle size of 1 μm or less: 12% by number, content of particles having a particle size of 60 μm or more: 0% by number, CV: 70%) was used instead of using 100 g of the silica particle (FB-40S).

Example 5

A composition for a silicone resin (silica particle content: 50% by weight) was obtained in the same manner as in Example 1, except that in Example 1, a surface-treated silica particle obtained by mixing a silane coupling agent solution having 1 g of N-2-(aminoethyl)-3-aminopropyltrimethoxysilane dissolved in 99 g of water and 100 g of a silica particle (FB-40S), stirring the mixture at 25° C. for 24 hours and then collecting a silica particle by filtration, followed by drying was used instead of using 100 g of the silica particle (FB-40S). Incidentally, a treatment amount of the silane coupling agent was 1 part by weight based on 100 parts by weight of the silica particle to be subjected to the treatment.

Example 6

A composition for a silicone resin (silica particle content: 50% by weight) was obtained in the same manner as in Example 5, except that in Example 5, the amount of N-2-(aminoethyl)-3-aminopropyltrimethoxysilane to be used for the surface treatment of the silica particle was changed from 1 g to 0.5 g. Incidentally, a treatment amount of the silane coupling agent was 0.5 parts by weight based on 100 parts by weight of the silica particle to be subjected to the treatment.

Example 7

A composition for a silicone resin (silica particle content: 50% by weight) was obtained in the same manner as in Example 5, except that in Example 5, the amount of N-2-(aminoethyl)-3-aminopropyltrimethoxysilane to be used for the surface treatment of the silica particle was changed from 1 g to 0.166 g. Incidentally, a treatment amount of the silane coupling agent was 0.166 parts by weight based on 100 parts by weight of the silica particle to be subjected to the treatment.

Example 8

A composition for a silicone resin (silica particle content: 50% by weight) was obtained in the same manner as in Example 5, except that in Example 5, the amount of N-2-(aminoethyl)-3-aminopropyltrimethoxysilane to be used for the surface treatment of the silica particle was changed from 1 g to 0.125 g. Incidentally, a treatment amount of the silane coupling agent was 0.125 parts by weight based on 100 parts by weight of the silica particle to be subjected to the treatment.

Example 9

A composition for a silicone resin (silica particle content: 50% by weight) was obtained in the same manner as in Example 5, except that in Example 5, the silane coupling agent to be used for the surface treatment of the silica particle was changed from 1 g of N-2-(aminoethyl)-3-aminopropyltrimethoxysilane to 1 g of hexamethyldisilazane. Incidentally, a treatment amount of the silane coupling agent was 1 part by weight based on 100 parts by weight of the silica particle to be subjected to the treatment.

Comparative Example 1

A composition for a silicone resin was obtained in the same manner as in Example 1, except that in Example 1, the silica particle was not contained.

Comparative Example 2

A composition for a silicone resin (silica particle content: 30% by weight) was obtained in the same manner as in Example 1, except that in Example 1, 43 g of a silica particle (Crystallite 5×, manufactured by Tatsumori Ltd., average particle size: 1.4 μm, content of particles having a particle size of 1 μm or less: 16% by number or more, content of particles having a particle size of 60 μm or more: 0% by number, specific surface area: 14.5 m$^2$/g) was used instead of using 100 g of the silica particle (FB-40S).

Formulations of the compositions of Examples 1 to 9 and Comparative Examples 1 to 2 are summarized and shown in Table 1.

TABLE 1

| | Formulation | | | | | | | | | |
|---|---|---|---|---|---|---|---|---|---|---|
| | Resin constituted of raw materials (1) to (6) | | (7) Silica particle | | | | | | | |
| | Viscosity[1] (mPa·s) | Content (parts by weight) | Kind | Average particle size (μm) | ≦1[2] (% by number) | 60≦[3] (% by number) | Coefficient of variation (CV, %)[4] | Silane coupling agent (Kind) | Surface treatment amount (parts by weight)[5] | Content (parts by weight) |
| Example 1 | 12300 | 100 | FB-40S | 40 | 2 | 15 | 45 | — | — | 100 |
| Example 2 | 12300 | 100 | FB-40S | 40 | 2 | 15 | 45 | — | — | 43 |
| Example 3 | 12300 | 100 | FB-7SDC | 5.8 | 8 | 0 | 59 | — | — | 43 |
| Example 4 | 12300 | 100 | FB-3SDC | 3.4 | 12 | 0 | 70 | — | — | 43 |
| Example 5 | 12300 | 100 | FB-40S | 40 | 2 | 15 | 45 | DAMO[6] | 1 | 100 |
| Example 6 | 12300 | 100 | FB-40S | 40 | 2 | 15 | 45 | DAMO[6] | 0.5 | 100 |

TABLE 1-continued

| | Resin constituted of raw materials (1) to (6) | | (7) Silica particle | | | | | | | |
|---|---|---|---|---|---|---|---|---|---|---|
| | | | | Average | | | Coefficient | Silane | Surface treatment | |
| | Viscosity[1] (mPa·s) | Content (parts by weight) | Kind | particle size (μm) | ≤1[2] (% by number) | 60≤[3] (% by number) | of variation (CV, %)[4] | coupling agent (Kind) | amount (parts by weight)[5] | Content (parts by weight) |
| Example 7 | 12300 | 100 | FB-40S | 40 | 2 | 15 | 45 | DAMO[6] | 0.166 | 100 |
| Example 8 | 12300 | 100 | FB-40S | 40 | 2 | 15 | 45 | DAMO[6] | 0.125 | 100 |
| Example 9 | 12300 | 100 | FB-40S | 40 | 2 | 15 | 45 | HMDS[7] | 1 | 100 |
| Comparative Example 1 | 12300 | 100 | — | — | — | — | — | — | — | — |
| Comparative Example 2 | 12300 | 100 | Crystallite 5X | 1.4 | 16 or more | 0 | — | — | — | 43 |

[1] Viscosity (mPa·s) at 25° C.
[2] Content (% by number) of particles having a particle size of not more than 1 μm in the silica particle
[3] Content (% by number) of particles having a particle size of 60 μm or more in the silica particle
[4] Coefficient of variation (CV, %) of particle size of the silica particle
[5] Use amount (parts by weight) based 100 parts by weight of the silica particle to be subjected to the surface treatment
[6] DAMO: N-2-(Aminoethyl)-3-aminopropyltrimethoxysilane
[7] HMDS: Hexamethyldisilazane A semi-cured material, a completely cured material and an optical semiconductor device were prepared using each of the resulting compositions according to the following methods.

Preparation Example 1 of Semi-Cured Material

Each of the compositions was applied in a thickness of 600 μm on a biaxially oriented polyester film (manufactured by Mitsubishi Chemical Polyester Film Co., Ltd., 50 μm) and then cured under a condition shown in Table 2 or 3, thereby preparing a semi-cured material (sheet) in a sheet form.

Preparation Example 1 of Completely Cured Material

Each of the resulting sheets was heated at 150° C. for 5 hours to prepare a completely cured material silicone resin sheet.

Fabrication Example 1 of Optical Semiconductor Device

A substrate on which a blue LED was mounted was coated with each of the resulting sheets in a semi-cured state, followed by heating under reduced pressure at 160° C. for 5 minutes to perform encapsulation processing at a pressure of 0.2 MPa. The resulting device was heated at 150° C. for one hour, thereby completely curing the resin. There was thus fabricated an optical semiconductor device.

With respect to Examples 1 to 4 and Comparative Examples 1 to 2, characteristics were evaluated using the resulting semi-cured materials, completely cured materials and optical semiconductor devices according to the following Test Examples 1 to 6. The results are shown in Table 2. Incidentally, in the evaluation as referred to herein, how the average particle size and particle size distribution of the silica particle influence the characteristics is examined.

Test Example 1

Storage Stability A

With respect to each of the semi-cured materials immediately after preparation and after storage at room temperature (25° C.) for 24 hours, at the time of applying a load of 7 g/mm² using a sensor head, a distance of sinking of the sensor head from the surface of the semi-cured material was measured using a digital length meter (MS-5C, manufactured by Nikon Corporation), and a sheet hardness was determined on the basis of the following expression.

Sheet hardness=[1−{(Distance (μm) of sinking of sensor head)/(Film thickness (μm) of semi-cured material)}]×100

Next, by taking a ratio of the hardness of the resulting sheet [(hardness after storage)/(hardness immediately after preparation)×100] as a hardness retention (%), the storage stability was evaluated according to the following criteria. Incidentally, it is meant that the larger the sheet hardness value, the higher the hardness is; and that the smaller the hardness retention, the more excellent the storage stability is.

[Evaluation Criteria of Storage Stability A]
A: The hardness retention is from 100 to 150%.
B: The hardness retention is more than 150%.

Test Example 2

Elastic Modulus and Breaking Elongation

Each of the resulting completely cured material sheets was evaluated by determining a tensile elastic modulus (MPa) and a breaking elongation (%) using an autograph (AGS-J, manufactured by Shimadzu Corporation). It is meant that the higher the tensile elastic modulus, the higher the mechanical strength is; and that the larger the breaking elongation, the more excellent the fracture resistance against tensileness is.

Test Example 3

Light Transmittance

A light transmittance (%) of each of the completely cured materials at a wavelength of 450 nm was measured using a spectrophotometer (U-4100, manufactured by Hitachi High-Technologies Corporation). It is meant that the higher the light transmittance, the more excellent the light transmission properties are.

Test Example 4

Adhesiveness

Each of the compositions was applied in a thickness of 50 μm on an aluminum substrate (manufactured by Nittoshinko Corporation) or a white resist-applied substrate (SSR-6300S, manufactured by San-Ei Kagaku Co., Ltd.), on which was then placed a silicone chip of 2 mm in square; and the resultant was cured by heating at 135° C. for 4 minutes and further heating at 150° C. for 5 hours. A push-pull gauge was laterally pushed against the silicone chip on the resulting cured material, thereby measuring a force (peel force, N/chip) required for peeling off the silicone chip. It is meant that the higher the peel force, the more excellent the adhesiveness is.

Test Example 5

Encapsulation Properties

States of each of the optical semiconductor devices before and after encapsulation were observed under an optical microscope. The case where the optical semiconductor element was completely embedded, and neither deformation nor damage was observed in the bonding wire was evaluated as "A", and the case where deformation and damage were observed was evaluated as "B".

Test Example 6

Light Emitting Luminance

With respect to each of the devices lighted up at 50 mA, a relative value of its luminance was examined while taking a luminance of the device of Comparative Example 1 (not containing the silica particle) immediate after initiating the test as 100. The luminance was measured using an integrating sphere with an instantaneous multiple photometric system (MCPD-3000, manufactured by Otsuka Instruments Co., Ltd.). It is preferable that the relative value is 90 or more.

particle. Also, nevertheless the silica particle was contained, the lowering of the light emitting luminance was small. Above all, when the silica particle having a small average particle size is blended as in Examples 3 and 4, the breaking elongation is large, and the tensile resistance of the resin is increased. Also, the compositions of the Examples 1 to 4 are relieved relative to the curing condition as compared with that of Comparative Example 1, and an enhancement of the productivity is expected.

Next, with respect to Examples 1 and 5 to 9 and Comparative Example 1, characteristics were evaluated using each of the resulting semi-cured materials and optical semiconductor devices according to the foregoing Test Example 5 and the following Test Example 7. The results are shown in Table 3. Incidentally, in the evaluation as referred to herein, how the surface treatment of the silica particle influences the characteristics is examined.

Test Example 7

Storage Stability B

With respect each of the semi-cured materials immediately after preparation and after storage in a thermostat at 5° C. and 40° C., respectively for 168 hours, when a push terminal having a 5N load cell (UP-05K, manufactured by Aikoh Engineering Co., Ltd., terminal area: 23.75 mm$^2$) was pushed in a depth of 100 μm from the surface of the semi-cured material at a rate of 0.5 mm/min using a load tester (MODEL 1605 IIVL, manufactured by Aikoh Engineering Co., Ltd.), a hardness (MPa) of the semi-cured material was calculated from a gradient of a load change at displacements (from 80 to 100 μm), and the storage stability was evaluated according to the following evaluation criteria.

[Evaluation Criteria of Storage Stability B]

A: The hardness after storage is more than 0.005 MPa and 0.30 MPa or less.

TABLE 2

| | | Example 1 | Example 2 | Example 3 | Example 4 | Comparative Example 1 | Comparative Example 2 |
|---|---|---|---|---|---|---|---|
| Composition for uncured silicone resin | Resin viscosity (25° C., mPa·s) | 33100 | 28600 | 66900 | 68200 | 12300 | 29500 |
| Semi-cured silicone resin composition | Curing condition | 105° C., 9 min | 115° C., 7 min | 115° C., 7 min | 115° C., 7 min | 135° C., 4 min | 115° C., 7 min |
| | Storage stability A | A | A | A | A | A | B |
| Completely cured silicone resin composition | Elasticity (elastic modulus, MPa) | 1.3 | 0.70 | 0.49 | 0.40 | 0.30 | 0.37 |
| | Elasticity (breaking elongation, %) | 105 | 70 | 220 | 300 | 150 | 650 |
| | Light transmission properties (light transmittance, %) | 73 | 83 | 86 | 75 | 99 | 35 |
| | Adhesiveness (aluminum substrate, N/chip) | 0.30 | 0.29 | 0.26 | 0.25 | 0.23 | 0.23 |
| | Adhesiveness (white resist-applied substrate, N/chip) | 0.39 | 0.35 | 0.31 | 0.30 | 0.20 | 0.24 |
| Optical semiconductor device | Encapsulation properties | A | A | A | A | A | A |
| | Light emitting luminance (relative value) | 90 | 92 | 94 | 90 | 100 | 20 |

It is noted from the foregoing results that the compositions of Examples 1 to 4 are increased in the elastic modulus and enhanced in the adhesiveness to each substrate, as compared with that of Comparative Example 1 not containing the silica B: The hardness after storage is more than 0.30 MPa and 0.70 MPa or less.

C: The hardness after storage is 0.005 MPa or less or more than 0.70 MPa.

TABLE 3

|  |  | Example 1 | Example 5 | Example 6 | Example 7 | Example 8 | Example 9 | Comparative Example 1 |
|---|---|---|---|---|---|---|---|---|
| Composition for uncured silicone resin | Resin viscosity (25° C., mPa·s) | 33100 | 28900 | 30500 | 29000 | 29600 | 31800 | 12300 |
| Semi-cured silicone resin composition | Curing condition | 105° C., 9 min | 120° C., 720 min | 120° C., 25 min | 120° C., 13 min | 120° C., 10 min | 120° C., 5 min | 135° C., 4 min |
|  | Hardness immediately after storage (MPa) | 0.13 | 0.05 | 0.11 | 0.13 | 0.08 | 0.13 | 0.15 |
| Stored at 5° C. | Hardness after storage (MPa) | 0.18 | 0.05 | 0.11 | 0.19 | 0.12 | 0.22 | 0.18 |
|  | Storage stability B (MPa) | A | A | A | A | A | A | A |
| Stored at 40° C. | Hardness after storage (MPa) | 1.13 | 0.11 | 0.15 | 0.55 | 0.60 | 1.05 | 0.45 |
|  | Storage stability B (MPa) | C | A | A | B | B | C | B |
| Optical semiconductor device | Encapsulation properties | A | A | A | A | A | A | A |

It is noted from the foregoing results that the compositions of Examples 5 to 9 are excellent in the preservability in a semi-cured state and also excellent in the encapsulation properties because the silica particle is one treated with a silane coupling agent. Above all, when the silica particle having been subjected to a surface treatment with a basic silane coupling agent is blended as in Examples 5 to 8, the hardness change at any of 5° C. and 40° C. is small, so that it is suggested that the handling properties are excellent.

While the invention has been described in detail with reference to specific embodiments thereof, it will be apparent to one skilled in the art that various changes and modifications can be made therein without departing from the spirit and scope thereof.

Incidentally, the present application is based on Japanese Patent Applications No. 2010-126820 filed on Jun. 2, 2010 and No. 2010-262445 filed on Nov. 25, 2010, and the contents are incorporated herein by reference.

All references cited herein are incorporated by reference herein in their entirety.

Also, all the references cited herein are incorporated as a whole.

The composition for a thermosetting silicone resin of the invention is suitably used at the manufacture of semiconductor elements of, for example, backlights of liquid crystal screen, signals, outdoor large-sized displays, advertisement boards and so on.

What is claimed is:

1. A composition for a thermosetting silicone resin, comprising:
    (1) an organopolysiloxane having a silanol group at an end thereof;
    (2) an alkenyl group-containing silicon compound;
    (3) an epoxy group-containing silicon compound;
    (4) an organohydrogensiloxane;
    (5) a condensation catalyst;
    (6) a hydrosilylation catalyst; and
    (7) a silica particle,
    wherein the (7) silica particle has a 50% volume cumulative diameter of from 2 to 50 μm, a content of particles having a particle size of 1 μm or less of 15% by number or less and a content of particles having a particle size of 60 μm or more of 15% by number or less.

2. The composition according to claim 1, wherein the (1) organopolysiloxane having a silanol group at an end thereof comprises a compound represented by the following formula (I):

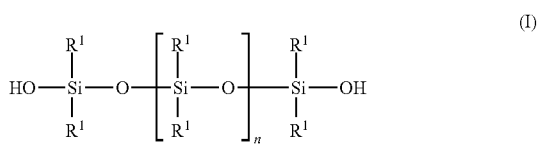

wherein $R^1$ represents a monovalent hydrocarbon group; and n represents an integer of 1 or more, provided that all $R^1$ groups may be the same or different from each other.

3. The composition according to claim 1, wherein the (2) alkenyl group-containing silicon compound comprises a compound represented by the following formula (II):

$$R^2—Si(X^1)_3 \quad (II)$$

wherein $R^2$ represents a substituted or unsubstituted alkenyl group; and $X^1$ represents a halogen atom, an alkoxy group, a phenoxy group or an acetoxy group, provided that three $X^1$ groups may be the same or different from each other.

4. The composition according to claim 1, wherein the (3) epoxy group-containing silicon compound comprises a compound represented by the following formula (III):

$$R^3—Si(X^2)_3 \quad (III)$$

wherein $R^3$ represents an epoxy structure-containing substituent; and $X^2$ represents a halogen atom, an alkoxy group, a phenoxy group or an acetoxy group, provided that three $X^2$ groups may be the same or different from each other.

5. The composition according to claim 1, wherein the (4) organohydrogensiloxane is at least one kind selected from the group consisting of a compound represented by the following formula (IV):

(IV)

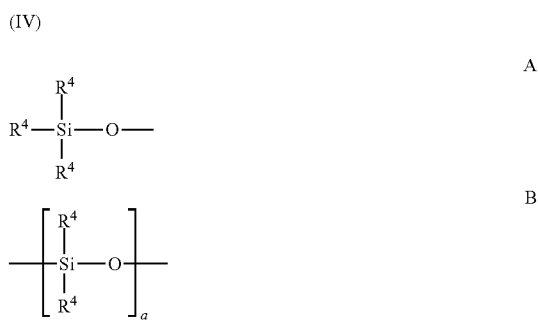

-continued

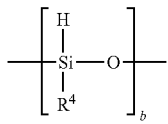
C wherein each of A, B and C represents a constituent unit, A represents an end unit, and each of B and C represents a repeating unit; $R^4$ represents a monovalent hydrocarbon group; a represents 0 or an integer of 1 or more; and b represents an integer of 2 or more, provided that all $R^4$ groups may be the same or different from each other; and a compound represented by the following formula (V):

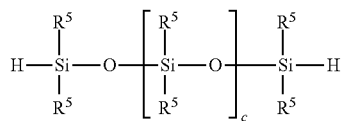
(V)

wherein $R^5$ represents a monovalent hydrocarbon group; and c represents 0 or an integer of 1 or more, provided that all $R^5$ groups may be the same or different from each other.

6. The composition according to claim 1, wherein the (7) silica particle has a surface treated with a basic silane coupling agent.

7. The composition according to claim 1, wherein the (7) silica particle has a 50% volume cumulative diameter of from 2 to 30 μm.

8. A silicone resin sheet obtained by semi-curing the composition according to claim 1.

9. A silicone resin cured material obtained by curing the silicone resin sheet according to claim 8.

10. An optical semiconductor device obtained by encapsulating an optical semiconductor element with the silicone resin sheet according to claim 8.

* * * * *